United States Patent [19]
Kinto et al.

[11] Patent Number: 5,511,495
[45] Date of Patent: Apr. 30, 1996

[54] METHOD OF PROCESSING A MIXTURE OF BOTTOM ASH AND FLY ASH

[75] Inventors: Kouichiro Kinto, Mie; Tadashi Ichihara, Gifu, both of Japan

[73] Assignee: Daido Tokushuko Kabushiki Kaisha, Japan

[21] Appl. No.: 436,731

[22] Filed: May 5, 1995

[30] Foreign Application Priority Data

| May 17, 1994 | [JP] | Japan | 6-128335 |
| Mar. 23, 1995 | [JP] | Japan | 7-091680 |

[51] Int. Cl.$^6$ ............................................ F23C 5/00
[52] U.S. Cl. .................................... 110/165 A; 110/166
[58] Field of Search .................. 110/165 A, 165 R, 110/166, 216, 171

[56] References Cited

U.S. PATENT DOCUMENTS

| Re. 34,775 | 11/1994 | Nechvatel et al. | 110/165 A |
| 2,493,960 | 1/1950 | Gladden | 110/165 A |
| 2,917,011 | 12/1959 | Korner | 110/165 A |
| 3,776,149 | 12/1973 | Teich et al. | 110/165 A |
| 3,841,241 | 10/1974 | Dewey et al. | 110/165 R |
| 3,875,875 | 4/1975 | Stenlund | 110/165 A |
| 4,387,651 | 6/1983 | Moore | 110/166 |
| 5,024,169 | 6/1991 | Borowy | 110/165 A |
| 5,237,940 | 8/1993 | Pieper et al. | 110/165 A |
| 5,315,937 | 5/1994 | Williams | 110/165 R |

*Primary Examiner*—Marguerite Macy
*Attorney, Agent, or Firm*—Majestic, Parsons, Siebert & Hsue

[57] ABSTRACT

Bottom ash is taken out of an incinerator after undergoing a moistening process and is subjected to a drying process to reduce its water content to less than 10 weight % or it is taken out of the incinerator with water content less than 10 weight %. Fly ash is taken out of the discharge gas processing system of the incinerator without going through a moistening process. The bottom ash and fly ash, thus taken out, are separately weighed and discharged to a same transporting device and are transported to a melting furnace while being mixed together.

16 Claims, 3 Drawing Sheets

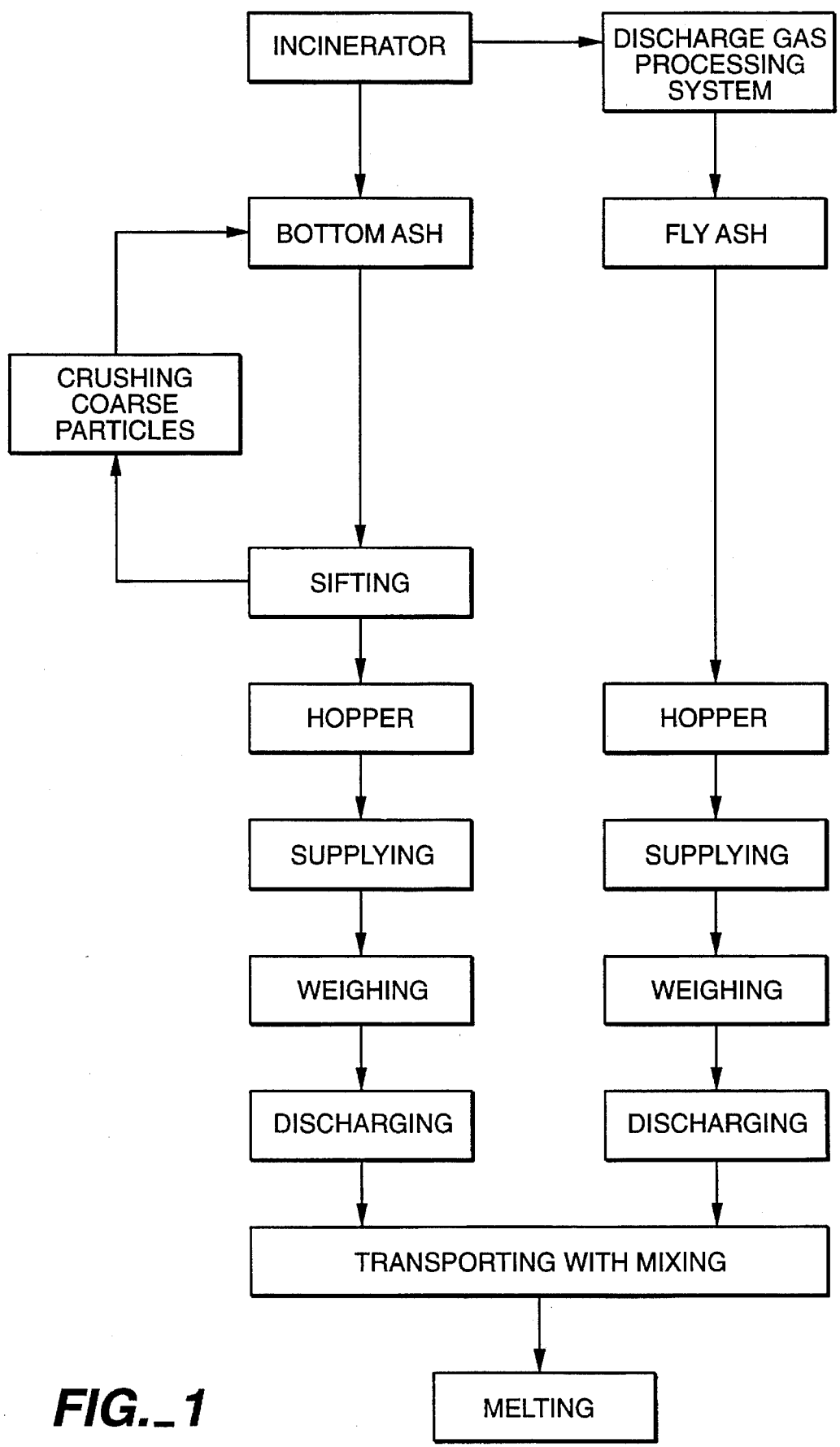
FIG._1

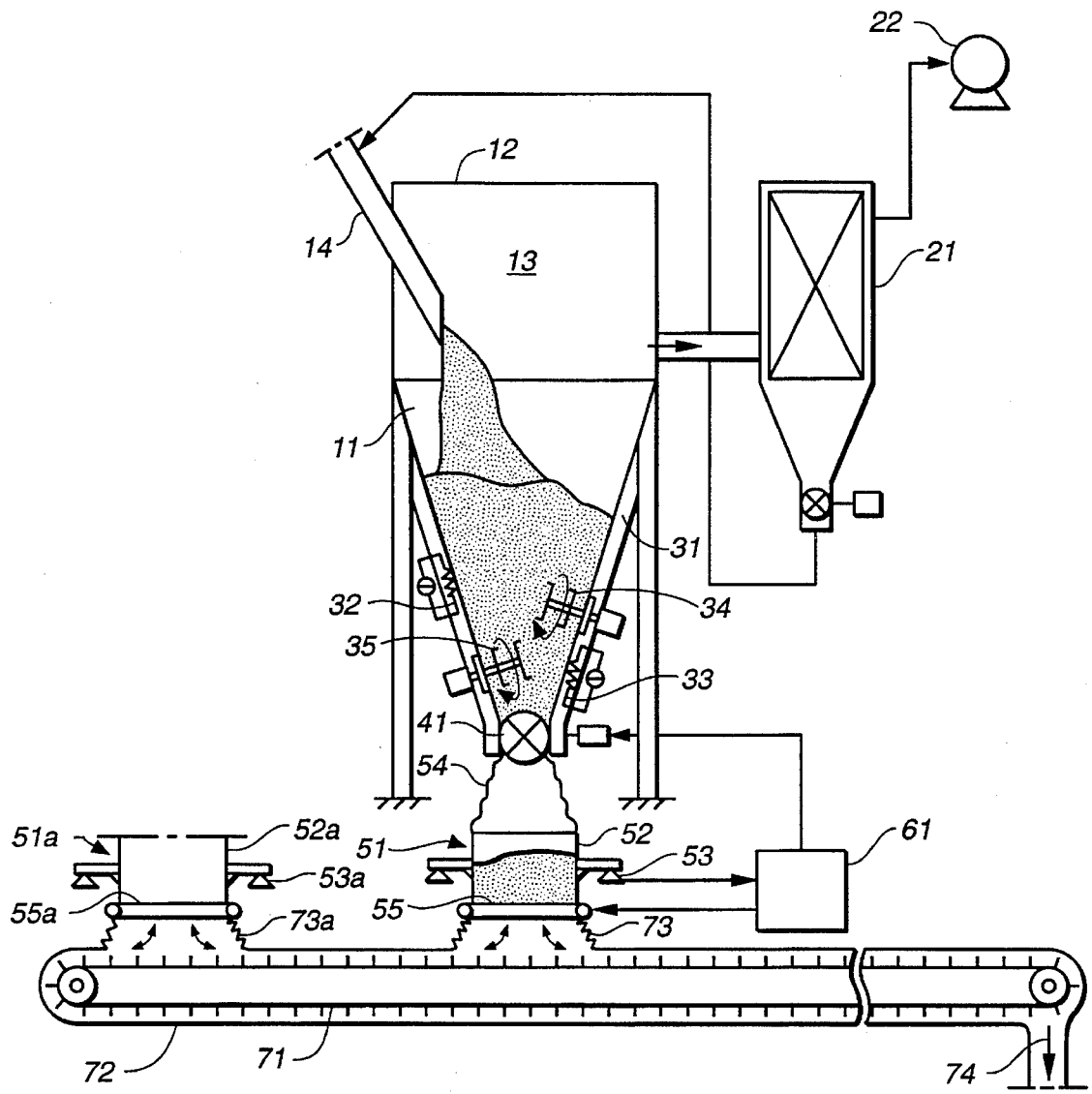
FIG._2

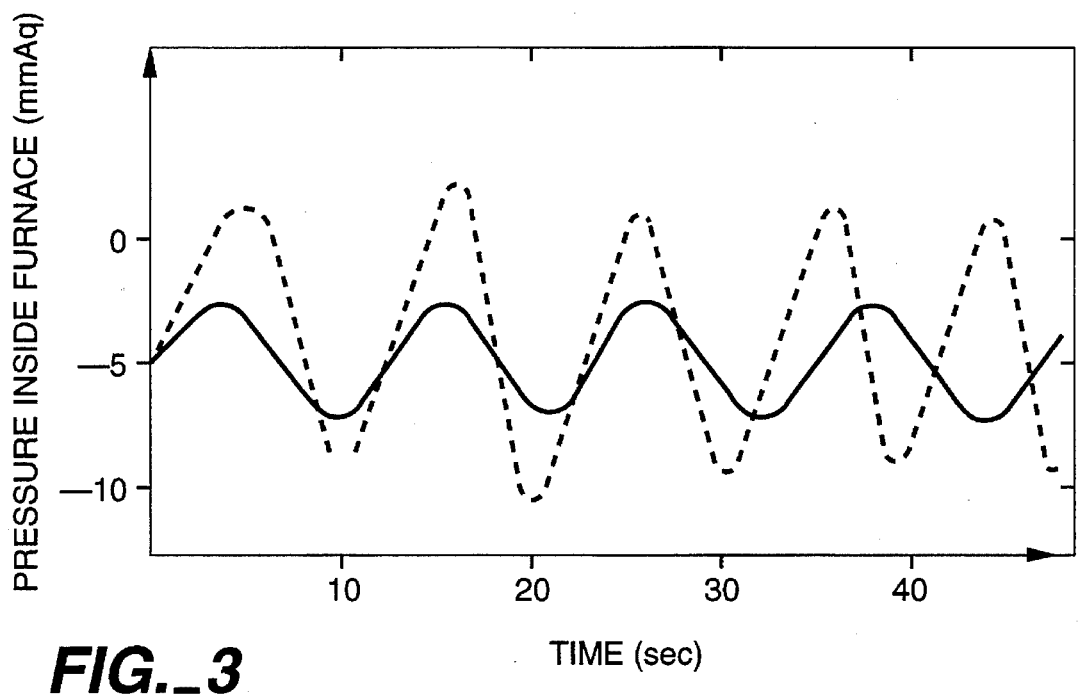
FIG._3
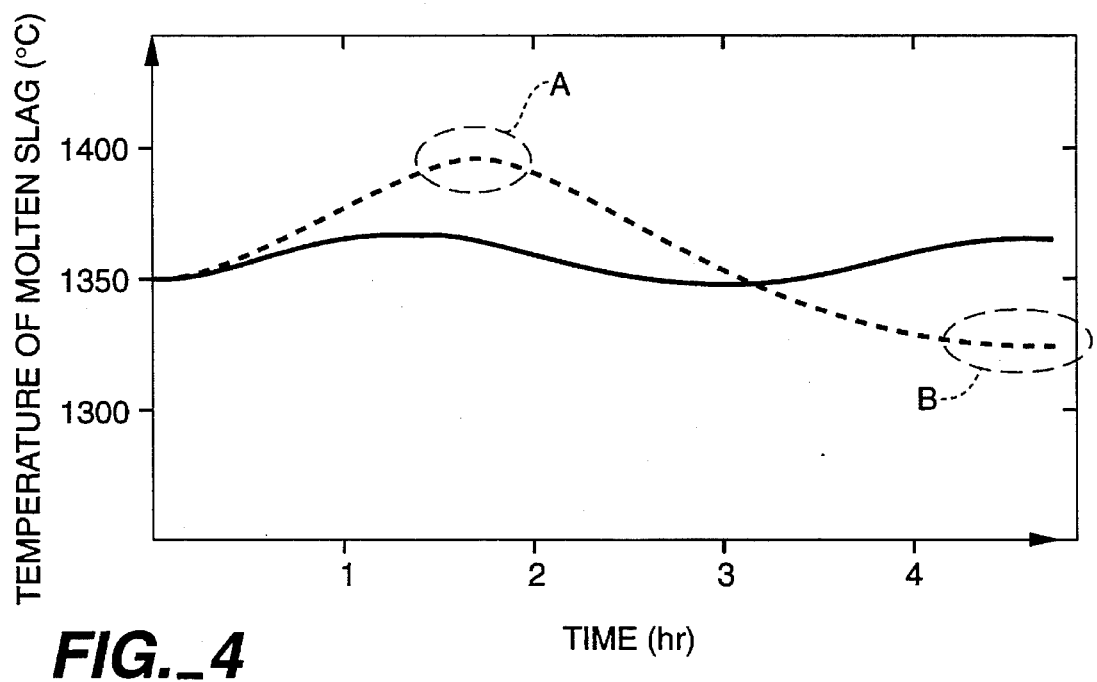
FIG._4

METHOD OF PROCESSING A MIXTURE OF BOTTOM ASH AND FLY ASH

BACKGROUND OF THE INVENTION

1. Field of the Invention

This invention relates to a method of processing a mixture of bottom ash and fly ash by melting. When refuse of all kinds such as city garbage, sewer sludge and industrial wastes are incinerated, both bottom ash and fly ash are generated, the bottom ash being what remains inside the incinerator and the fly ash being what is collected mainly in the discharge gas processing system connected to the incinerator or in a dust collector provided in the discharge gas processing system. These ashes are thereafter subjected to a melting process inside a melting furnace such as an arc furnace, a plasma arc furnace, a resistance furnace, an induction furnace or a burner furnace in order to reduce their volume and to render them harmless. This invention relates to a method of processing such a mixture of bottom ash and fly ash by melting.

2. Prior Art

Bottom ash, which remains in the incinerator, is normally subjected to a moistening process in order to prevent it from flying around all over and to make it easier to handle. Examples of such a moistening process includes soaking the ash in water and spraying water over the ash. Whichever method may be used, bottom ash normally contains a significant amount of water (normally about 30–70 weight %) when taken out of the incinerator after such a moistening process.

According to prior methods of processing a mixture of bottom ash and fly ash by melting as disclosed, for example, in Japanese Patent Publication Tokkai 56-80613 and Japanese Utility Model Publication Jikkai 5-34426, the bottom ash containing a significant amount of water, as described above, is dried first to a certain extent. Both kinds of ash are thereafter stored in hoppers and are dropped into a space having a specified volume provided below the hoppers, and what has thus been dropped is fed into a melting furnace by means of a pusher, a screw conveyer or a rotary valve.

Such prior art methods, however, involve problems of the following kinds. Firstly, moistened ash still contains enough water even after it is dried to a certain extent, such that its adhesive force is quite strong and its angle of repose is substantially large. Such bottom ash is easily attached to the hopper or the conveyer and forms bridges and tunnels inside the hopper, frequently thereby clogging openings. Secondly, bottom ash containing a significant amount of water may generate sodium hydroxide from the sodium component also contained in the ash. If such bottom ash is mixed with fly ash, there is the danger that hydrogen gas may be generated by a reaction between sodium hydroxide and metallic aluminum or zinc contained in the fly ash. Thirdly, since this is basically a constant-volume method whereby bottom ash and fly ash are both dropped from their respective hoppers into a space having a specified volume, the weights of the ashes supplied into the melting furnace may vary sharply if there is a change in their bulk specific weights or their heights in the hoppers. This will cause instability in the operation of the melting furnace and also in the discharge of molten slag which is generated. Bottom ash and fly ash have significantly different properties and compositions, flying ash having a smaller specific weight and containing more volatile components than bottom ash. Thus, if there is a change in the supply rate or in the weight ratio between the two kinds of ash, although there may be no change in the supply rate, there results a change in the melting temperature as well as in pressure inside the melting furnace. If the operation of the melting furnace becomes unstable in this manner, the molten slag generated in the furnace may stagnate near the outlet or unmolten ash may fly out together with molten slag.

SUMMARY OF THE INVENTION

It is therefore an object of this invention to eliminate the problems of the prior art methods described above by providing a new method of melting bottom ash and fly ash for processing.

A method according to this invention for processing a mixture of bottom ash and fly ash by melting, with which the above and other objects can be accomplished, may be characterized as comprising the steps of separately supplying bottom ash, which has been dried subsequent to a moistening process such that its water content has been reduced to less than 10 weight % or of which the water content is less than 10 weight % when taken out of an incinerator, and fly ash taken out of a discharge gas processing system of the incinerator without undergoing a moistening process, weighing them, thereafter discharging them both on the same transporting device and supplying them into a melting furnace while they are being mixed together.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a process diagram of a method according to an embodiment of this invention FIG. 2 is a partially sectional view, schematically showing an apparatus used for the method shown in FIG. 1;

FIG. 3 is a graph of pressure changes inside the furnace during a melting process in test and comparison examples; and FIG. 4 is a graph of temperature changes of molten slag generated inside the furnace in test and comparison examples.

DETAILED DESCRIPTION OF THE INVENTION

Examples of bottom ash under consideration in this application include the residues which are obtained when refuse of all kinds such as city garbage, sewer sludge and industrial wastes is incinerated inside an incinerator. Examples of fly ash under consideration in this application include substances which fly off with the discharge gas when such refuse as described above is incinerated in an incinerator and are collected in its discharge gas processing system, or what is collected mainly by a dust collector provided in such a discharge gas processing system. According to a method of this invention, bottom ash and fly ash as described above are caused to undergo a melting process simultaneously inside a melting furnace. Examples of melting furnace which may be used for the melting process include arc furnaces, plasma arc furnaces, resistance furnaces, induction furnaces and burner furnaces.

According to this invention, either bottom ash which has undergone a moistening process is taken out of an incinerator and dried such that its water content becomes less than 10 weight % or bottom ash with water content less than 10 weight % is taken out of an incinerator. Generally, bottom ash taken out of an incinerator has a substantially large water content of about 20–50 weight % because of a moistening process, as explained above. Bottom ash which has undergone a moistening process is subjected to a drying process such that its water content becomes less than 10 weight %. If no moistening process is carried out, on the other hand, there may be bottom ash with water content of less than 5 weight %. In other words, if no moistening process was carried out or if a moistening process was carried out only lightly, it is possible to take out bottom ash with water content less than 10 weight % from an incinerator. In either situation, bottom ash should have water content of less than 10 weight %. If the water content exceeds 10 weight %, the adhesive force of bottom ash increases sharply and its angle of repose also increases rapidly such that the ash becomes likely to get stuck to the hopper and the conveyer, clogging various openings. If the water content is less than 10 weight %, there is no free water on the surface of the ash and there is no danger of generation of hydrogen gas even if it is mixed with fly ash.

According to this invention, fly ash is taken out of the discharge gas processing system of an incinerator without undergoing a moistening process. What is referred to as fly ash is mainly what is collected in the dust collector installed in the discharge gas processing system, as explained above, but it may also include substances which precipitate and are deposited inside the discharge gas duct or the like of the discharge gas processing system. The water content of fly ash is generally less than 1 weight % and its particle size is very small (1 to several tens of μm). Fly ash is usually likely to volatilize harmful substances when re-heated, and a neutralizing agent such as calcium hydroxide or calcium carbonate is usually added in order to neutralize the gas of hydrochloric acid which is generated at the time of the incineration process. According to this invention, such fly ash is taken out as it is.

Bottom ash from an incinerator, of which the water content has been reduced to less than 10 weight % by a drying process or which has been taken out with water content less than 10 weight %, and fly ash taken from a discharge gas processing system are both likely to get scattered because of their low water contents. For this reason, it is preferable to seal the ash-supplying system in order to prevent the scattering of the ashes. If a drying process is carried out, the drier and the parts downstream should be sealed. If there is no drying process, the downstream supplying parts should be sealed inclusive of the take-out port for bottom ash. Similarly, in order to prevent fly ash from getting scattered, it is preferred to seal the downstream supplying system inclusive of the take-out port for fly ash. As will be explained in detail below, the hoppers provided to the downstream supplying system, weighing devices, transportation equipment and their connecting parts are all to be sealed.

According to the present invention, bottom ash with water content less than 10 weight % and fly ash are separately supplied and weighed individually. It is such that the weights by which they are supplied will be stabilized and hence that their mixture will be supplied into the melting furnace at a constant rate. This has the effect of stabilizing the melting temperature and pressure inside the melting furnace and allows molten slag to be discharged in a stabilized manner.

Bottom ash, which has undergone a drying process to reduce its water content to less than 10 weight % or which has been taken out with water content less than 10 weight %, is stored in a hopper, and fly ash taken out of a discharge gas processing system is stored in another hopper. In a situation where bottom ash, which has undergone a moistening process and contains a significant amount of water, is taken out of an incinerator and subjected to a drying process, a transporting device is used between a drier and the hopper, and both the drier and the transporting device, inclusive of their connection parts, are sealed. When bottom ash is taken out of an incinerator with water content less than 10 weight %, on the other hand, a transporting device is set between the take-out port of the incinerator for bottom ash and the hopper therefor, and both the transporting device and its connecting parts are sealed. Similarly, the take-out port for the discharge gas processing system and the hopper for fly ash are connected by another transporting device, and this transporting device is also sealed together with its connecting parts.

It is preferable to subject the bottom ash to a sifting process and a crushing process before storing it in the hopper for bottom ash such that only those particles which have passed through a sift with mesh size less than 25 mm will be received in the hopper. This is such that the mixing with fly ash can proceed uniformly, as will be explained below, and the melting of the mixture can proceed more efficiently. In a situation where bottom ash, which has undergone a moistening process and has a significantly large water content, is taken out of an incinerator and is subjected to a drying process, it is preferable to subject the ash to a preliminary drying process to reduce its water content normally to about 15–20 weight % and then to a sifting or crushing process to select only those particles which pass a sift with mesh size less than 25 mm, to subject only those selected particles to a next drying process to reduce their water content to less than 10 weight % and to store only these particles in the hopper. It is because the drying process can thus be carried out more efficiently.

All kinds of drier can be used for the drying process such as the rotary kind, the belt type and tunnel type, but it is preferable to use a hot-air type rotary drier. Similarly, all kinds of sift can be used for the sifting process such as the rotary kind, the vibrating kind and the swinging kind, but it is preferable to use a rotary sift. All kinds of crusher or mill can be used for the crushing process but a hammer mill of side impact and shearing type is preferred. When drying, sifting and crushing processes are carried out, the drier, the sift and the crusher are all sealed, as well as their connecting parts.

A supplying mechanism such as a rotary valve is provided below each hopper for bottom ash or fly ash. A weighing device is set below the supplying mechanism, and a discharge mechanism such as an open-close dumper is set below the weighing device. The weighing device comprises a container and a load cell which holds the container. The load cell is connected to a calculator-controller such that the supplying mechanism is stopped by a signal outputted from the calculator-controller when a specified amount of bottom ash or fly ash has been loaded in the container. The discharge mechanisms are activated thereafter such that, for example, the open-close dumpers are opened to discharge the specified amounts of bottom ash and fly ash into the same transporting device, as will be explained below. The weighing device is structured such that the weight of the hopper is not on the load cell. The space between the bottom of the hopper and the weighing device is sealed by an expandable material, such as bellows, The hopper for fly ash is preferably provided with a heat source such as a heater on its outer circumference and stirrer vanes inside because fly ash, by nature, is hygrophillic and is likely to form bridge-like formations and, when it absorbs moisture, its tendency to form bridge-like formations or blocks is enhanced. It may be attempted to place a heater inside the hopper or to vibrate the hopper instead of providing vanes for stirring, but they have only the effects of accelerating the formation of bridge-like structures.

It is preferred to connect a suction blower or a bag filter to the upper space inside both the hopper for bottom ash and that for fly ash. This is because minute harmful particles of heavy metals, organic chloride compounds and the like, contained in bottom ash and fly ash, are floating in these areas. Even if the hoppers themselves and their connecting parts are sealed, it is difficult to completely prevent such harmful substances from leaking out. This is why the air in the upper space is sucked out from each hopper in order to catch the harmful substances with a bag filter and the interior of each hopper is kept in a negative-pressure condition such that the harmful substances are prevented from leaking out of the hoppers.

According to the present invention, weighed portions of bottom ash and fly ash are discharged onto the same transporting device and are transported while becoming mixed together until the mixture is introduced into a melting furnace through its feeding port. If the bottom ash and fly ash are uniformly mixed together, temporary increases in volatile components inside the furnace or localized generation of unmolten bottom ash or fly ash can be prevented. The transporting device and its connecting parts are sealed. The mixture of bottom ash and fly ash may be adapted to be weighed again before it is introduced into the melting furnace.

Because the physical properties and compositions of bottom ash and fly ash vary, depending upon the kinds of refuse from which they are obtained, whether or not a moistening process has been carried out, the extent to which such a process has been carried out, the method of catching ash, and the kind and quantity of the additive to the fly ash, it is difficult to conclude generally at what ratio they should be mixed together. In general, however, the temperature required for the melting process increases sharply if the ratio of flying ash exceeds 60 weight %, and the melting process becomes difficult to carry out from a practical point of view. For this reason, it is preferred to keep the mixing ratio of fly ash below 50 weight % with a safety factor taken into consideration.

FIG. 1 shows a process diagram according to an embodiment of this invention. Bottom ash which has been taken out of an incinerator with water content less than 10 weight % is sifted. After the coarse residue is crushed and sifted again, the portion that has passed through a sift is stored in a hopper for bottom ash. When bottom ash which has gone through a moistening process and contains a significant amount of water is taken out of an incinerator and subjected to a drying process, the moistened bottom ash is subjected to a preliminary drying process before it is sifted. After the sifting process, it is subjected once again to a drying process. After its water content is thus reduced to less than 10 weight %, it is stored in the hopper for bottom ash. Fly ash, which is taken out of the discharge gas processing system of the incinerator without going through a moistening process, is stored in another hopper for fly ash. Ash from each hopper is supplied to a weighing device and specified amounts of bottom ash and fly ash are discharged to the same transporting device which transports the two kinds of ash while mixing them together to the melting furnace.

FIG. 2 shows an apparatus which uses the method described above with reference to FIG. 1. A hopper 11 in the shape of an inverted cone has a cover 12 at its top, and a chute 14 for introducing fly ash is inserted to an upper space 13 of the hopper 11 surrounded by the cover 12. The upper space 13 is connected to a bag filter 21, of which the downstream side is connected to a suction blower 22 such that the air inside the upper space 13 is sucked by the suction blower 22. This has the effect of keeping the upper space 13 in a negative pressure condition, and the harmful substances floating are caught in the bag filter 21 and returned to the chute 14.

The external circumference of the hopper 11 is covered by a thermally insulating member 31 and provided with heaters 32, 33. Vanes 34, 35 for stirring are provided inside the hopper 11, and a rotary valve 41 is disposed at the bottom of the hopper 11. Below the rotary valve 41 is a weighing device 51 comprised of a container 52 and a load cell 53 receiving the container 52. A bellows 54 is provided to seal the space between the bottom of the hopper 11 and the upper end of the container 52. An open-close dumper 55 is provided below the container 52.

The load cell 53 is connected to a calculator-controller 61 which, in turn, is connected to driving mechanisms for the rotary valve 41 and the open-close dumper 55. When the weight of the fly ash inside the container 52 reaches a specified level, a signal is outputted from the calculator-controller 61. The rotary valve 41 is thereby stopped and the open-close dumper 55 is opened thereafter such that a specified weight of fly ash is discharged. Although not separately shown, there is another hopper similarly structured for bottom ash, having a weighing device associated therewith indicated by symbol 51a. The weighing device 51a associated with the hopper for bottom ash also comprises a container 52a and a load cell 53a and there is an open-close dumper 55a provided below the container 52a. The load cell 53a is also connected to the same calculator-controller 61 (although the connecting arrow is not shown).

A conveyer 71 with scrapers for transportation is disposed below the open-close dumpers 55, 55a. The conveyer 71 is enclosed inside a cover 72, and the space between the bottoms of the containers 52, 52a and the cover 72 is sealed by bellows 73, 73a. The cover 72 is provided with an opening 74 at the downstream end, connected to the feeding port of a melting furnace such that specified amounts of bottom ash and fly ash discharged from the containers 52 and 52a are mixed together as they are transported by the conveyer 71 to be introduced into the melting furnace.

As a test example of this invention, the process diagram of FIG. 1 was followed by using an apparatus shown in FIG. 2 to process, by melting in a three-phase AC arc furnace, bottom ash and fly ash obtained by incinerating city garbage in a stoker furnace. Bottom ash was taken out from the bottom of the stoker furnace without a moistening process. After it was subjected to a sifting process and a crushing process, particles which could pass a sift with mesh size of 25 mm were stored in a hopper for bottom ash. Fly ash was collected without going through a moistening process from the bottom of an electric dust collector installed in the discharge gas processing system of the stoker furnace and was directly stored in a hopper for fly ash. Table 1 shows the results of analysis of the bottom ash and fly ash immediately after they were stored in the hoppers. The numbers in Table 1 are all in units of weight % except the bulk specific weight. The bottom ash and fly ash stored in the hoppers were individually measured and discharged at weight ratio of 60/40 onto the conveyer with scrapers.

TABLE 1

|  | Bottom ash | Fly ash |
| --- | --- | --- |
| (Overall Properties) |  |  |
| Water content | 5.0 | 1.8 |
| Bulk specific density | 1.05 | 0.48 |
| Ash component (dry base) | 93 | 99 |
| Metal component (dry base) | 7 | 1 |
|  | (Al: 2 wt %) |  |
| (Composition of ash component)(dry base) |  |  |
| Total mercury | — | 0.21 |
| Silicon dioxide | 35.2 | 6.3 |
| Calcium oxide | 17.9 | 50.4 |
| Ferric oxide | 16.6 | 0.3 |
| Magnesium oxide | 2.6 | 1.9 |
| Manganese oxide | — | <0.1 |
| Titanium dioxide | 0.9 | 0.4 |
| Aluminum oxide | 15.1 | 4.0 |
| Sulphur | 0.18 | 1.6 |
| Total phosphorus | 0.7 | 0.26 |
| Chromic oxide | 0.1 | <0.1 |
| Lead | 0.08 | 0.12 |
| Copper | 0.19 | 0.04 |
| Zinc | 0.31 | 0.51 |
| Sodium oxide | 3.6 | 2.8 |
| Potassium oxide | 1.4 | 2.7 |
| Chloride ion | 0.85 | 13.5 |
| Sulfuric acid ions | 0.15 | 1.78 |

For comparison, bottom ash and fly ash, obtained by incinerating in a stoker furnace the same city garbage as used in the test example above, were processed by melting in a three-phase AC arc furnace. The bottom ash taken out from the bottom of the stoker furnace was put in a cooling water tank for the convenience of handling. Since its water content was as high as 45 weight %, it could not be directly subjected to a melting process, it was dried first until its water content was reduced to 15 weight %. Thereafter a sifting process and a crushing process were carried out as in the test example, and particles which could pass a sift with mesh size of 25 mm were stored in a hopper for bottom ash. Fly ash was stored in a hopper for fly ash, as in the test example. The bottom ash and the fly ash stored in the hoppers were discharged onto a conveyer with scrapers for transportation by a prior art constant-volume method. For the purpose of testing, the load cell and the calculator-controller of FIG. 2 were not operated. Instead, the rotary valve was stopped at specified time intervals and the open-close dumpers were opened to discharge specified volumes of the bottom ash and fly ash filling the containers (volume ratio between bottom ash and fly ash =60/40).

FIG. 3 shows the pressure changes inside the furnace during the melting process in the aforementioned test and comparison examples, and FIG. 4 shows the temperature changes of the molten slag generated inside the furnace. In FIG. 3, the horizontal axis indicates the time (in seconds) and the vertical axis indicates the pressure (in mmAq) inside the furnace. In FIG. 4, the horizontal axis indicates the time (in hours) and the vertical axis indicates the temperature (in ° C.) of molten slag. In both FIGS. 3 and 4, the solid line indicates the result of the test example and the broken line indicates the comparison example. In the comparison test, when the inside pressure of the furnace exceeded 0 mmAq, as indicated in FIG. 3, the exhaust gas blew out of the furnace. The part of the broken line in FIG. 4 indicated by letter A shows the moment when a large quantity of molten slag was discharged, and the part indicated by letter B shows when the molten slag remained inside the furnace. FIGS. 3 and 4 clearly show that both the operation of the furnace and the discharge of the molten slag proceeded steadily in the test example, as compared to the comparison example.

Although not shown separately, a portion of bottom ash with water content of 30 weight %, taken out from a bottom part of the stoker furnace and thrown into a cooling water tank, was preliminarily dried to reduce its water content to 15 weight % and then subjected to a sifting process and a crushing process, and the particles which could pass through a sift with mesh size 25 mm were further dried until the water content was reduced to 5 weight %. These particles were mixed with fly ash, and the mixture was subjected to a melting process. The result was similar to that of the test example described above.

When the fly ash was thrown into the same cooling water tank as the bottom ash, the overall water content became 50 weight %. Not only was the mixture very difficult to dry, but also a major portion of the fly ash was scattered around with the discharge gas at the time of the drying process. Thus, the scale of the processing system for the discharge gas became too large, and it was extremely uneconomical.

In summary, the present invention has the merit of providing an economical method of processing a mixture of bottom ash and fly ash by a stable melting process.

What is claimed is:

1. A method of processing a mixture of bottom ash and fly ash by melting, said method comprising the steps of:

taking out bottom ash which has undergone a moistening process from an incinerator;

subjecting said bottom ash to a drying process until the water content of said bottom ash becomes less than 10 weight %;

taking out fly ash from a discharge gas processing system of said incinerator separately from said bottom ash without a moistening process;

weighing portions of said bottom ash and said fly ash separately;

discharging said weighed portions onto a same transporting device; and transporting said discharged portions of said bottom ash and fly ash by said transporting device into a melting furnace while mixing said discharged portions together.

2. The method of claim 1 further comprising the steps of subjecting said dried bottom ash to a sifting process and storing only a part of said bottom ash which can pass through a sift with mesh size of 25 mm.

3. The method of claim 1 further comprising the steps of independently storing said bottom ash and said fly ash in separate hoppers and supplying said bottom ash and said fly ash from said hoppers to weighing devices through supplying mechanisms attached to bottom parts of said hoppers, specified weights of said bottom ash and fly ash being discharged from said weighing devices through discharge mechanisms attached below said weighing devices.

4. The method of claim 2 further comprising the steps of independently storing said bottom ash and said fly ash in separate hoppers and supplying said bottom ash and said fly ash from said hoppers to weighing devices through supplying mechanisms attached to bottom parts of said hoppers, specified weights of said bottom ash and fly ash being discharged from said weighing devices through discharge mechanisms attached below said weighing devices.

5. The method of claim 3 wherein the hopper in which said fly ash is stored has a heat source on an outer circumference thereof and vanes for stirring therein.

6. The method of claim 4 wherein the hopper in which said fly ash is stored has a heat source on an outer circumference thereof and vanes for stirring therein.

7. The method of claim 5 wherein each of said hoppers has a suction blower and a bag filter connected to an upper space therein.

8. The method of claim 6 wherein each of said hoppers has a suction blower and a bag filter connected to an upper space therein.

9. A method of processing a mixture of bottom ash and fly ash by melting, said method comprising the steps of:

taking bottom ash with water content less than 10 weight % out of an incinerator;

taking fly ash from a discharge gas processing system of said incinerator separately from said bottom ash without a moistening process;

weighing portions of said bottom ash and said fly ash separately;

discharging said weighed portions onto a same transporting device; and transporting said discharged portions of said bottom ash and fly ash by said transporting device into a melting furnace while mixing said discharged portions together.

10. The method of claim 9 further comprising the steps of subjecting said dried bottom ash to a sifting process and storing only a part of said bottom ash which can pass through a sift with mesh size of 25 mm.

11. The method of claim 9 further comprising the steps of independently storing said bottom ash and said fly ash in separate hoppers and supplying said bottom ash and said fly ash from said hoppers to weighing devices through supplying mechanisms attached to bottom parts of said hoppers, specified weights of said bottom ash and fly ash being discharged from said weighing devices through discharge mechanisms attached below said weighing devices.

12. The method of claim 10 further comprising the steps of independently storing said bottom ash and said fly ash in separate hoppers and supplying said bottom ash and said fly ash from said hoppers to weighing devices through supplying mechanisms attached to bottom parts of said hoppers, specified weights of said bottom ash and fly ash being discharged from said weighing devices through discharge mechanisms attached below said weighing devices.

13. The method of claim 11 wherein the hopper in which said fly ash is stored has a heat source on an outer circumference thereof and vanes for stirring therein.

14. The method of claim 12 wherein the hopper in which said fly ash is stored has a heat source on an outer circumference thereof and vanes for stirring therein.

15. The method of claim 13 wherein each of said hoppers has a suction blower and a bag filter connected to an upper space therein.

16. The method of claim 14 wherein each of said hoppers has a suction blower and a bag filter connected to an upper space therein.

* * * * *